(12) United States Patent
Shoda et al.

(10) Patent No.: US 11,201,998 B2
(45) Date of Patent: Dec. 14, 2021

(54) IMAGING APPARATUS AND CONTROL METHOD THEREOF

(71) Applicant: CANON KABUSHIKI KAISHA, Tokyo (JP)

(72) Inventors: Satoshi Shoda, Utsunomiya (JP); Hideyuki Hamano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 32 days.

(21) Appl. No.: 16/358,995

(22) Filed: Mar. 20, 2019

(65) Prior Publication Data
US 2019/0297268 A1 Sep. 26, 2019

(30) Foreign Application Priority Data

Mar. 22, 2018 (JP) .............................. JP2018-054086

(51) Int. Cl.
*H04N 5/232* (2006.01)
*H04N 5/3745* (2011.01)

(52) U.S. Cl.
CPC ..... *H04N 5/232122* (2018.08); *H04N 5/3745* (2013.01)

(58) Field of Classification Search
None
See application file for complete search history.

(56) References Cited

U.S. PATENT DOCUMENTS

| 8,928,791 B2 | 1/2015 | Okita et al. | |
| 2017/0366770 A1* | 12/2017 | Yokogawa | H04N 5/3696 |
| 2018/0077337 A1* | 3/2018 | Fujii | H04N 5/3696 |

FOREIGN PATENT DOCUMENTS

JP 2013-106194 A 5/2013

\* cited by examiner

*Primary Examiner* — Twyler L Haskins
*Assistant Examiner* — Fayez A Bhuiyan
(74) *Attorney, Agent, or Firm* — Cowan, Liebowitz & Latman P.C.

(57) ABSTRACT

An imaging apparatus comprises an imaging element configured to have a plurality of photoelectric conversion units for each of a plurality of pixels arranged in a row direction and a column direction; at least one processor and memory holding a program which makes the processor function as: an acquisition unit configured to acquire an imaging signal based on a light beam that has passed through the entire pupil region of an imaging optical system and a first image signal based on a light beam that has passed through a part of the pupil region of the imaging optical system from the pixels; and a calculation unit configured to calculate a phase difference by using the imaging signal and the first image signal, wherein the calculation unit calculates the phase difference based on the first image signal and the imaging signal in the row that is the same as the first image signal or a neighboring row of the first image signal.

10 Claims, 15 Drawing Sheets

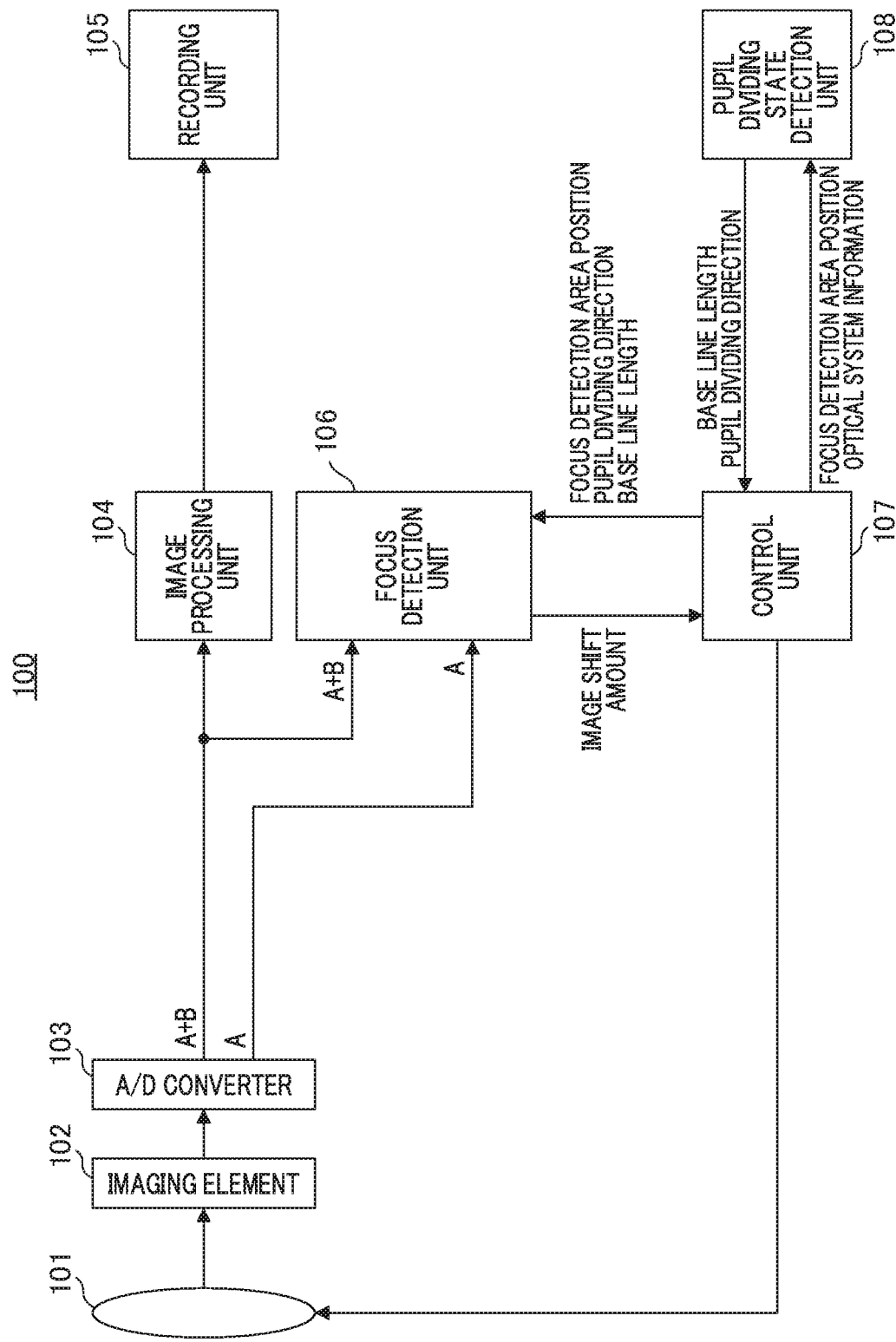

IMAGING APPARATUS AND CONTROL METHOD THEREOF

BACKGROUND OF THE INVENTION

Field of the Invention

The present invention relates to an imaging apparatus and a control method thereof.

Description of the Related Art

A phase difference detection method is known as a method for performing focus detection. In the phase difference detection method, a light beam that has passed through an exit pupil region of a shooting lens is divided, a relative deviation amount is calculated by comparing signals obtained based on the divided light beams, thereby obtaining a driving amount of the shooting lens for focusing. In recent years, an imaging apparatus that has a pupil dividing function by providing a plurality of photoelectric conversion units under micro lenses of each pixel of an imaging element, thereby an imaging signal and a phase difference method-focus detection signal can be obtained is known. Japanese Patent Application Laid-Open No. 2013-106194 discloses a technique in which two photoelectric conversion units are provided for each pixel, an A signal is read out from a first photoelectric conversion unit, an addition signal is read out from the first and second photoelectric conversion units, and a B signal of the second photoelectric conversion unit is obtained by subtracting the A signal from the addition signal.

However, in the case where each pixel has a plurality of photoelectric conversion units as disclosed in Japanese Patent Application Laid-Open No. 2013-106194, a desired frame rate may not be achieved in some cases because a readout time increases due to readout of signals of all the photoelectric conversion units individually. As a method for shortening the time required for readout, a method for limiting the readout position of signals to be used for focus detection is considered. For example, in a row not to be used for focus detection, only addition signals (imaging signals) of a plurality of photoelectric conversion units configured in unit pixels are output, and in a row to be used for focus detection, signals of the first photoelectric conversion unit are read out in addition to the addition signals (imaging signals) of the photoelectric conversion units configured in unit pixels. However, if the signals to be used for focus detection are limited and read out, a signal that is suitable for focus detection cannot be obtained depending on a readout interval of a focus detection signal, and as a result, a detection error may occur.

SUMMARY OF THE INVENTION

The present invention is to provide an imaging apparatus that can reduce an error in focus detection due to a phase difference.

An imaging apparatus of the present invention comprises an imaging element configured to have a plurality of photoelectric conversion units for each of a plurality of pixels arranged in a row direction and a column direction; at least one processor and memory holding a program which makes the processor function as: an acquisition unit configured to acquire an imaging signal based on a light beam that has passed through the entire pupil region of an imaging optical system and a first image signal based on a light beam that has passed through a part of the pupil region of the imaging optical system from the pixels; and a calculation unit configured to calculate a phase difference by using the imaging signal and the first image signal, wherein the calculation unit calculates the phase difference based on the first image signal and the imaging signal in the row that is the same as the first image signal or a neighboring row of the first image signal.

Further features of the present invention will become apparent from the following description of exemplary embodiments with reference to the attached drawings.

BRIEF DESCRIPTION OF THE DRAWINGS

FIG. 1 is a block diagram illustrating a configuration of an imaging apparatus.

DESCRIPTION OF THE EMBODIMENTS

Embodiment 1

Figure 2A:
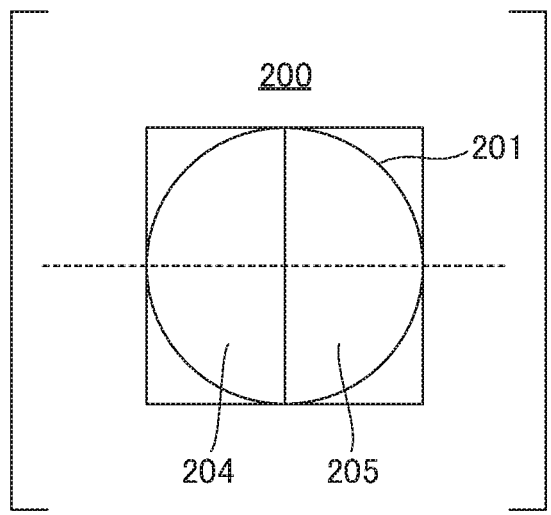
FIGS. 2A to 2C are block diagrams illustrating a configuration of a pixel configured in an imaging element.

Hereinafter, embodiments of the present invention will be described in detail with reference to the drawings. In each drawing, the same reference numerals are provided for the same members, and duplicate explanations will be omitted.

FIG. 1 is a block diagram of an imaging apparatus 100 according to the present embodiment. The imaging apparatus 100 includes an imaging optical system 101, an imaging element 102, an A/D converter 103, an image processing unit 104, a recording unit 105, a focus detection unit 106, a control unit 107, and a pupil dividing state detection unit (hereinafter, referred to as "state detection unit") 108. Note that the imaging apparatus 100 is not limited to an imaging apparatus in which a lens device and the main body are integrated and an interchangeable lens imaging apparatus in which a lens device including the imaging optical system 101 that can be attached to and detached from the main body may be used. Additionally, the image processing unit 104, the focus detection unit 106, the control unit 107, and the state detection unit 108 are realized by, for example, a CPU.

The imaging optical system 101 is a lens unit including a plurality of lens groups. The imaging optical system 101 includes, for example, a focusing lens for adjusting a focus position and a lens driving actuator. The imaging element 102 includes a pixel group having a pupil dividing function. The imaging element 102 photoelectrically converts a light beam incident through the imaging optical system 101 and outputs the light beam to the A/D converter 103. The A/D converter 103 converts an output signal (analog signal) of the imaging element 102 into a digital signal.

The image processing unit 104 performs an image process of, for example, defective pixel correction, white balance adjustment, and a demosaic process on an image signal read out by the imaging element 102, and generates an image signal for recording. The generated imaging signal for recording is output to the recording unit 105. The recording unit 105 records the image signal for recording generated by the image processing unit 104. The recording unit 105 is, for example, a storage medium such as an SD card.

The focus detection unit 106 calculates an image shift amount in a focus detection area by using a correlation calculation. Specifically, the focus detection unit 106 accumulates an A+B image and an A image signal for each screen, and calculates the phase difference in a pupil dividing direction (image shift direction) by using a pair of image signals. The control unit 107 controls the entire system of the imaging apparatus 100. Moreover, the control unit 107 outputs the position information of the focus detection area and the vignetting information (in other words, information about the imaging optical system 101) to the state detection unit 108.

The state detection unit 108 calculates a base line length and a pupil dividing direction based on the position information of the focus detection area and the vignetting information obtained from the control unit 107, and outputs the base line length and the pupil dividing direction to the control unit 107. Additionally, the control unit 107 outputs the position information of the focus detection area and the base line length and the pupil dividing direction obtained from the state detection unit 108 to the focus detection unit 106. Subsequently, based on the position information of the focus detection area, the base length, and the pupil dividing direction obtained from the control unit 107, the focus detection unit 106 performs a correlation calculation for a pair of image signals, and outputs the calculated image shift amount to the control unit 107.

Figure 2B:
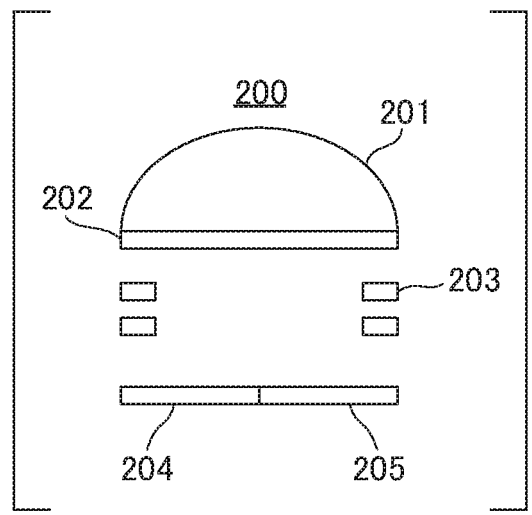
Figure 2C:
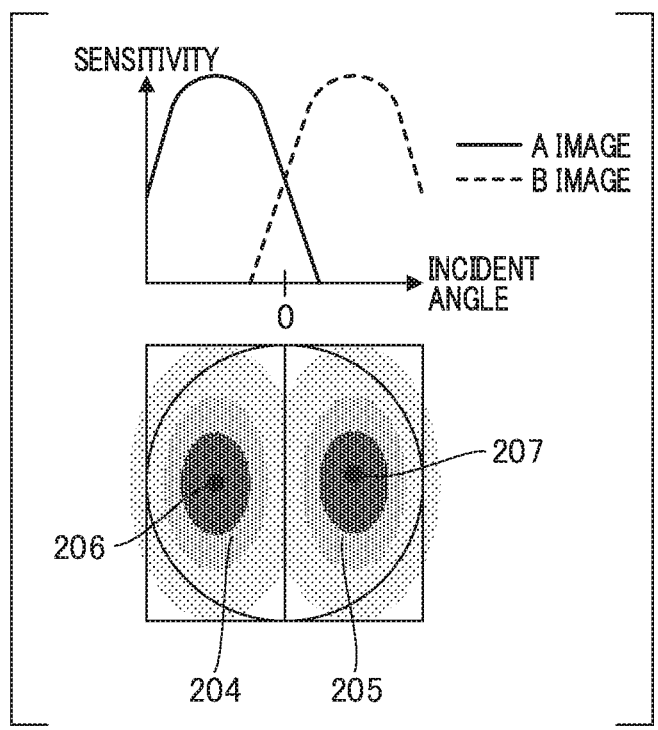

With reference to FIGS. 2A to 2C, details of the imaging element 102 in the first embodiment will be described. FIG. 2A is a plan view of the pixels of the imaging element 102. FIG. 2B is a cross-sectional view of the pixels of the imaging element 102. FIG. 2C illustrates a pupil intensity distribution in each photoelectric conversion unit of the A image and the B image.

The imaging element 102 has a plurality of pixels. The pixels are two-dimensionally arranged in the row direction and the column direction. Here, pixel 200 will be described as an example. The pixel 200 includes a micro lens 201, a color filter 202, a wiring layer 203, two photoelectric conversion units 204 and 205.

The micro lens 201 condenses the incident light beams and guides the light beams to the photoelectric conversion unit 204 and the photoelectric conversion unit 205. The color filter 202 passes a specific wavelength of the incident light beams. The color filter 202 having spectral sensitivity characteristics allowing wavelengths of red (R), green (G), and blue (B) to pass therethrough are arranged in the imaging element 102 in a Bayer pattern. Note that the arrangement of the color filter is not limited thereto.

The photoelectric conversion unit 204 and the photoelectric conversion unit 205 photoelectrically convert the incident light beams to generate an analog signal and outputs the analog signal to the A/D converter 103. Additionally, the photoelectric conversion unit 204 and the photoelectric conversion unit 205 are designed so as to enable respectively receiving light beams (pupil dividing images) that have passed through different regions of the exit pupil of the imaging optical system. Accordingly, it is possible to obtain signals in which pupils are divided on the right and left by providing the two photoelectric conversion units 204 and 205 for one micro lens 201. Additionally, an output that is equivalent to a normal pixel output can be obtained by adding the output of the photoelectric conversion unit 204 and the output of the photoelectric conversion unit 205. In the present embodiment, the output of the photoelectric conversion unit 204 and the photoelectric conversion unit 205 are added to generate an imaging signal (an addition image signal). Hereinafter, an image signal formed by a signal group obtained by the photoelectric conversion unit 204 is referred to as an "A image signal", an image signal formed by a signal group obtained by the photoelectric conversion unit 205 is referred to as a "B image signal", and an addition image signal of the A image and the B image is referred to as an "A+B image signal". That is, the imaging signal is a signal based on a light beam that has passed through the entire pupil region of the imaging optical system 101. The A image and the B image are signals based on the light beams that have passed through each part of the pupil region of the imaging optical system 101.

The upper graph in FIG. 2C illustrates the relation between an incident angle and a light receiving sensitivity for each of the A image and the B image. The horizontal axis indicates an incident angle for the pixel, and the vertical axis indicates a light receiving sensitivity. Additionally, the solid line shows the A image and the dotted line shows the B image. The distribution of the light receiving sensitivity determined based on the incident angle and the light receiving sensitivity is referred to as a "pupil intensity distribution", and the A image and the B image have a sensitivity that is symmetrical to the boundary line between the photoelectric conversion unit 204 and the photoelectric conversion unit 205.

The lower part in FIG. 2C illustrates the sensitivity distribution of the graph expressed in shades by superimposing the sensitivity distribution of the graph on pixels. The higher the density is, the higher the sensitivity is. A peak 206 is the peak of the sensitivity of the A image and a peak 207 is the peak of the sensitivity of the B image. In the present embodiment, the base line length is determined based on a distance between the two sensitivity peaks, and a pupil dividing direction, which is a direction of phase shift, is determined in accordance with the direction of a line that connects the peaks.

Additionally, the imaging element 102 has a readout control circuit (not illustrated). The readout control circuit can switch a first readout mode in which the A+B image is read out by adding the A image and the B image in advance inside the imaging element 102, and a second readout mode in which the A+B image and the A image are separately read out in a row unit.

Figure 3B:
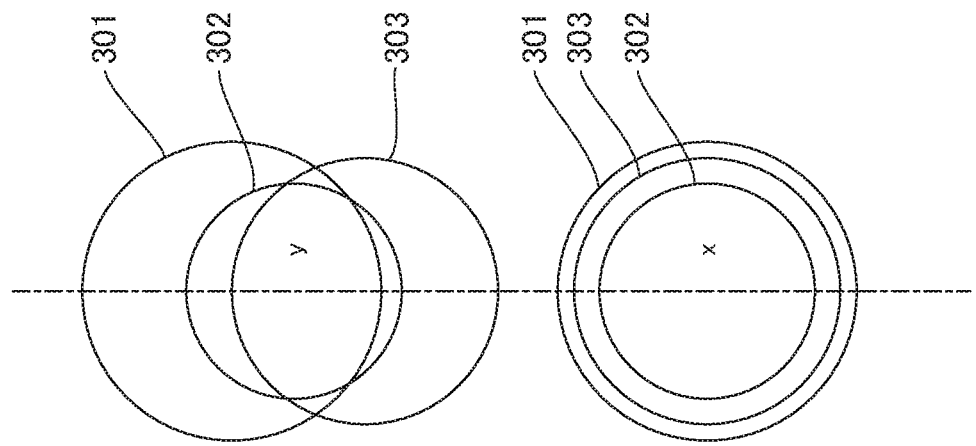
FIGS. 3A and 3B illustrate vignetting.
Figure 3A:
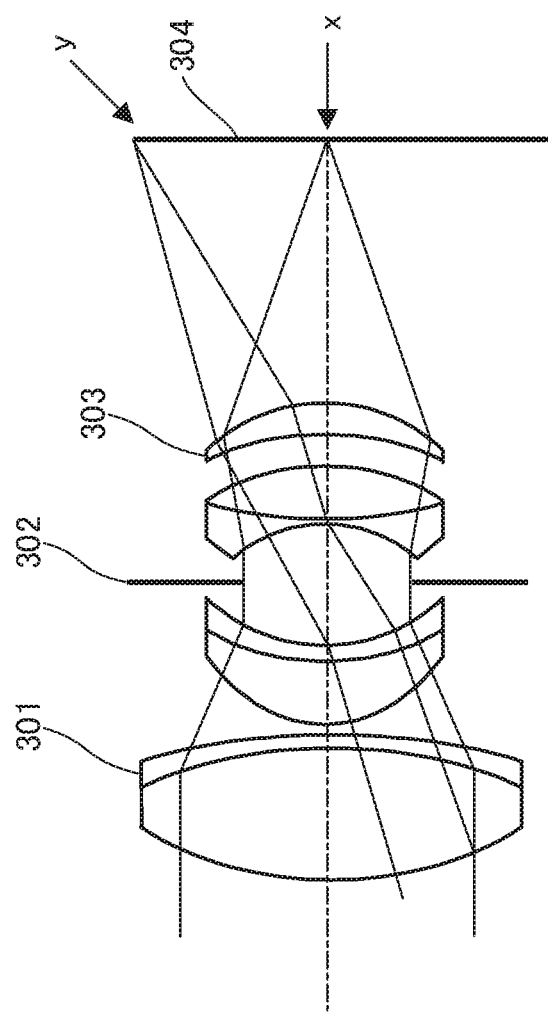

Next, vignetting will be described with reference to FIGS. 3A and 3B and FIG. 4. FIG. 3A illustrates an example of a configuration of the imaging optical system 101. FIG. 3B illustrates a method for overlapping frames through which a light can pass. The imaging optical system 101 includes a front lens 301, a diaphragm 302, and a rear lens 303. Note that an imaging plane 304 is an imaging plane of the imaging element 102. A frame through which a light can pass by the front lens 301 is referred to as a "front frame", and a frame through which a light can pass by the rear lens 303 is referred to as a "rear frame".

The lower part in FIG. 3B shows the overlapping of the frames of the front lens 301, the diaphragm 302, and the rear lens 303 as viewed from the center of the imaging place 304, in other words, the position "x" on the optical axis. The upper part in FIG. 3B shows the overlapping of the frames of the front lens 301, the diaphragm 302, and the rear lens 303 as viewed from the position "y", which is the peripheral part of the imaging plane 304. As viewed from the position "x", only the diaphragm 302 limits an amount of light. In contrast, as viewed from the position "y", an amount of light is limited also by the front frame of the front lens 301 and the rear frame of the rear lens 303 in addition to the diaphragm 302. Accordingly, an amount of light at the position "y" having a high image height is lower than the amount of light at the position "x". The phenomenon that the amount of light decreases as the image height increases away from the center of the optical axis is referred to as "vignetting". In the pupil-divided image, there is a property that the balance of an amount of received light is more disturbed due to vignetting as the image height increases.

Figure 4:
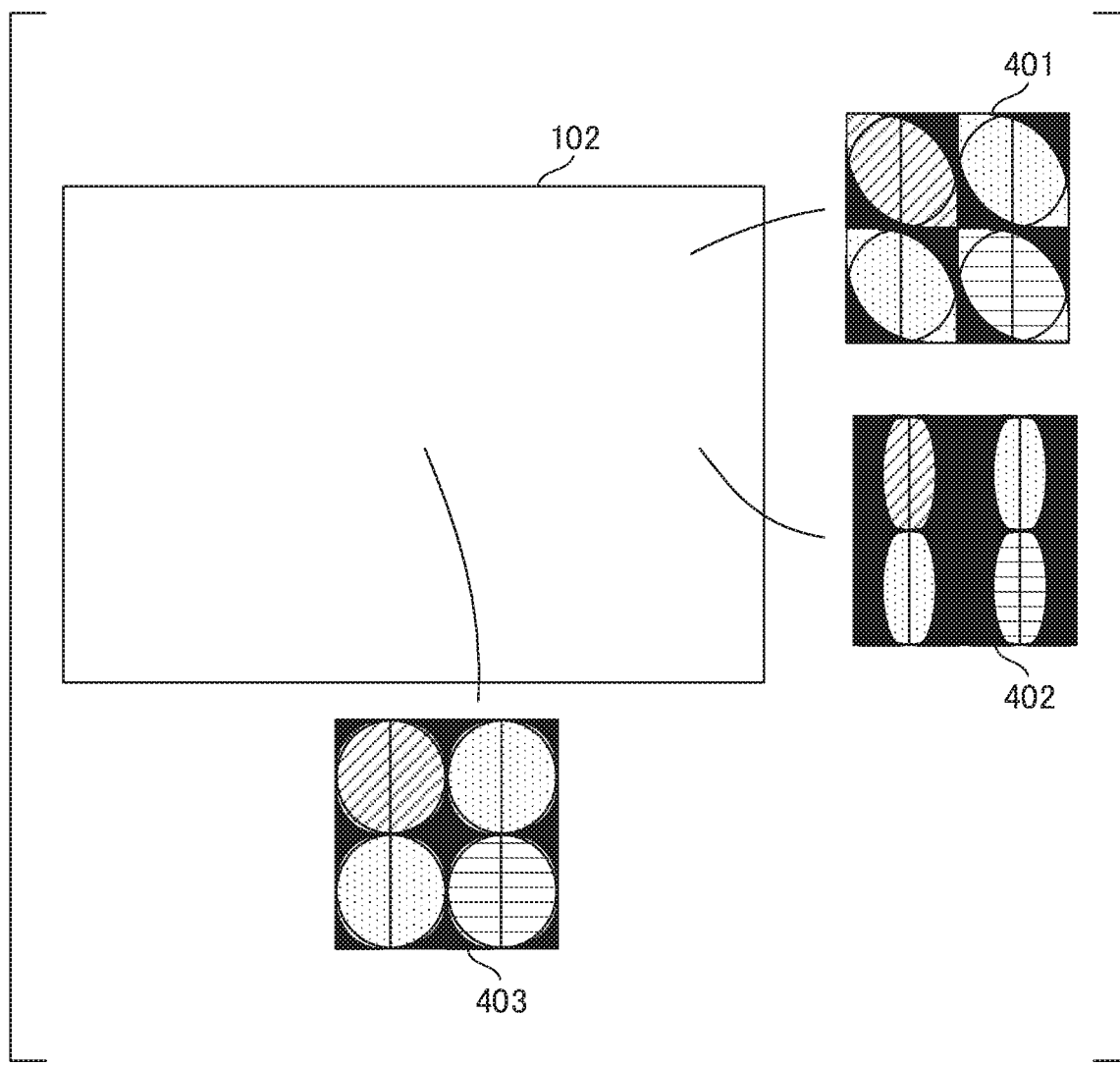
FIG. 4 illustrates a relation between a position on the imaging element and a vignetting shape.

FIG. 4 illustrates a relation between the pixels at each position of the imaging element 102 and the vignetting shape. A position 401 and a position 402 are located at the periphery of the imaging element 102, and a position 403 is located at the center of the imaging element 102. Additionally, the position 401 is located at the diagonal image height of the imaging element 102, and the position 402 is located at the horizontal image height of the imaging element 102. In particular, at the position of the diagonal image height of the imaging element as shown by the position 401 among the positions 401 to 403, the balance between an amount of received light that has been received by the photoelectric conversion unit 204 and an amount of received light that has been received by the photoelectric conversion unit 205 is largely lost.

Figure 5:
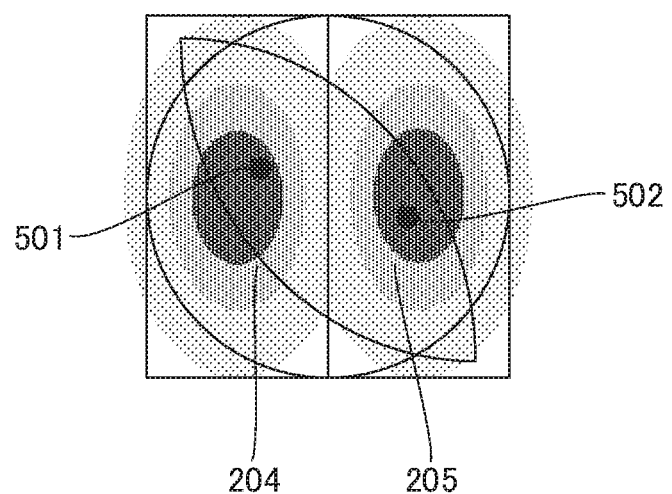
FIG. 5 illustrates the influence on a pixel due to vignetting.

FIG. 5 illustrates the pupil intensity distribution of the pixels located at the position 401 of the diagonal image height and the vignetting are overlapped. The pupil intensity distribution of the photoelectric conversion unit 204 and the photoelectric conversion unit 205 is cut in a shape like an ellipse due to vignetting. The peaks of the sensitivity of the photoelectric conversion unit 204 and the photoelectric conversion unit 205 are positions respectively shown by a peak 501 and a peak 502. Specifically, in the pixel of the position 401 of the diagonal image height, the peak of the sensitivity of the photoelectric conversion unit shifts depending on the shape of the vignetting, and a change occurs in the base line length and the phase shift direction as compared with a pixel where vignetting does not occur.

Figure 6:
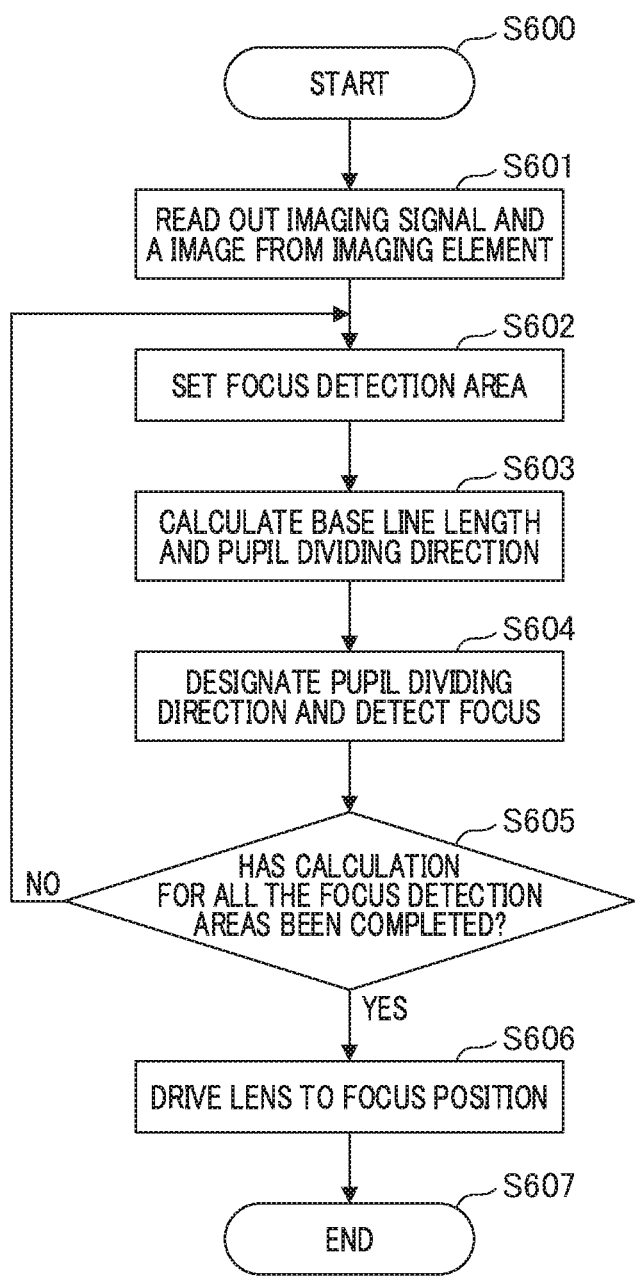
FIG. 6 is a flowchart of a shooting operation by the imaging apparatus.

Next, with reference to FIG. 6, a flow of focus detection performed by the imaging apparatus 100 in the present embodiment will be described. FIG. 6 is a flowchart showing a flow of focus detection performed by the imaging apparatus 100. In step S600, the imaging apparatus 100 starts a shooting sequence and starts focus detection. The shooting sequence starts, for example, if the shutter is pressed by a user. In step S601, signals are read out from the imaging element 102 for one plane. The signals to be read out at this time are an imaging signal (A+B image signal) and an A image signal. The signal readout in step S601 will be described in detail with reference to FIG. 7.

Figure 7:
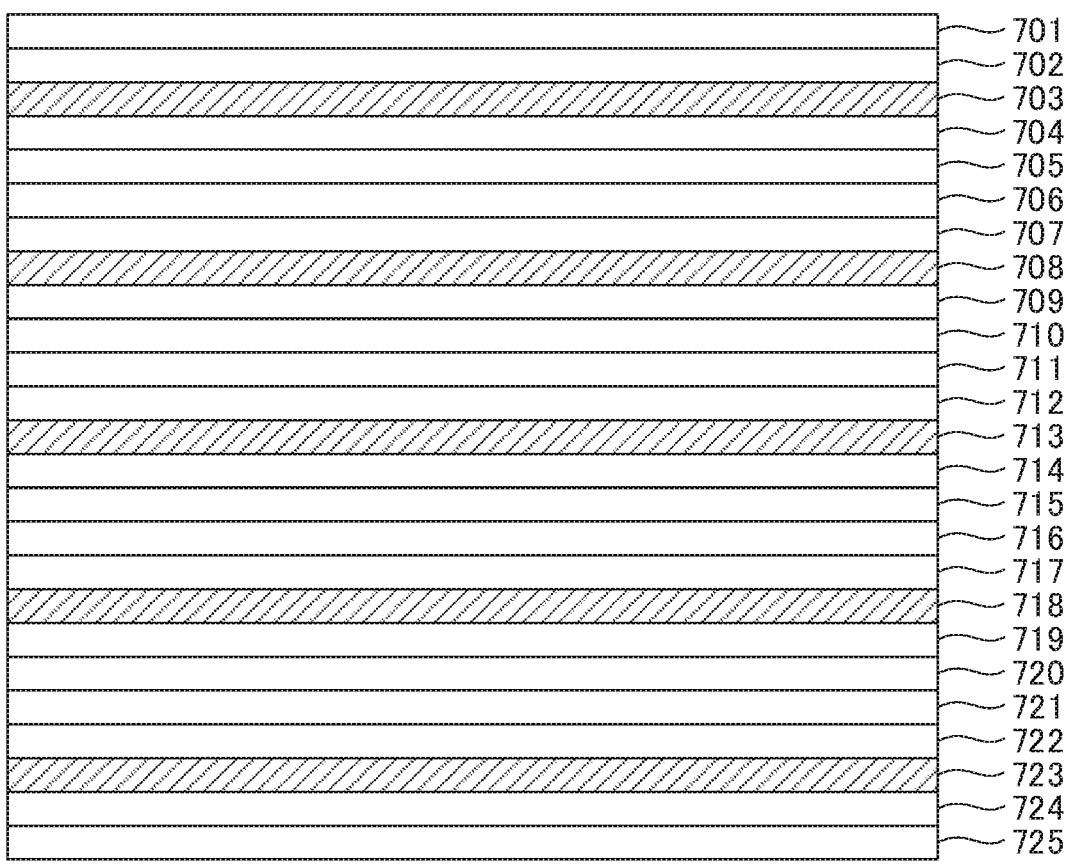
FIG. 7 illustrates a relation between the imaging element and a readout mode.

FIG. 7 illustrates readout control of each line of the imaging element 102. Each rectangle shown by lines 701 to 725 visually indicates a readout mode for each line of the imaging element 102. A white-colored line such as the line 701 is a line that is read out by the first readout mode in which only the imaging signal (A+B image signal) is read out. A hatched line such as the line 703 is a line that is read out by the second readout mode in which the A image signal is read out in addition to the imaging signal (A+B image signal). Specifically, in the imaging element 102, the imaging signal (A+B image signal) is read out in all the rows and the A image signal is discretely read out at 5 line intervals. Note that it suffices if the A image signal is discretely read out at predetermined line intervals, and the interval is not limited to 5 line intervals.

The description will return to FIG. 6. In step S602, the control unit 107 sets any focus detection area. Subsequently, the control unit 107 outputs the position information of the focus detection area that has been set and the information about the imaging optical system 101 to the state detection unit 108.

In step S603, the state detection unit 108 calculates the base line length and the pupil dividing direction based on the position information of the focus detection area of the imaging element 102 and the information about the imaging optical system 101 obtained from the control unit 107. Specifically, the state detection unit 108 has a parameter table of the base line length and the pupil dividing direction corresponding to the combination of the information about the imaging optical system 101 and the position of the focus detection area, and selects a suitable parameter in accordance with the combination to calculate a baseline length and a pupil dividing direction. Note that although an example in which the parameters calculated in advance are possessed as a table has been described here, the present invention is not limited to this, and a predetermined geometrical calculation may be performed in the imaging apparatus 100 so as to calculate the base line length and the pupil dividing direction. Subsequently, the state detection unit 108 outputs the calculated base line length and pupil dividing direction to the control unit 107, and the control unit 107 outputs the position information of the focus detection area, the base line length, and the pupil dividing direction to the focus detection unit 106.

In step S604, a correlation calculation in accordance with the pupil dividing direction by the focus detection unit 106 is performed to calculate a phase difference, and the focus is detected. Specifically, the focus detection unit 106 receives the position information of the focus detection area, the base line length, and the pupil dividing direction from the control unit 107, and performs a correlation calculation. The correlation calculation in step S604 will be described in detail with reference to FIGS. 8A and 8B.

Figure 8A:
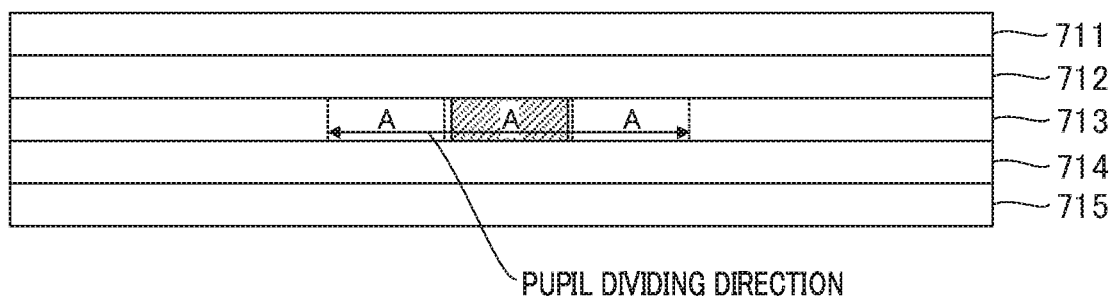
FIGS. 8A and 8B illustrate a correspondence relation of a correlation calculation in focus detection by the imaging apparatus.

FIG. 8A illustrates the correlation calculation at the image height center position of the imaging element 102. At the image height center position where no vignetting occurs, the sensitivity distributions of the A image and the B image are symmetrical in the horizontal direction, so that the pupil dividing direction becomes also the horizontal direction. Therefore, it is possible to calculate the shift position having the highest correlation by calculating a correlation amount at each shift position while shifting the relative positional relation between the A image and the A+B image in the horizontal direction. In FIG. 8A, the hatched portion shows a window range for calculating a correlation amount, and the range of the arrows on both sides of the hatched portion show the shift range of the window. As described above, at the image height center position where the pupil dividing direction becomes the horizontal direction, it is shown that the correlation amount is calculated while horizontally shifting the A image and the A+B image in the same row (the same line).

Figure 8B:
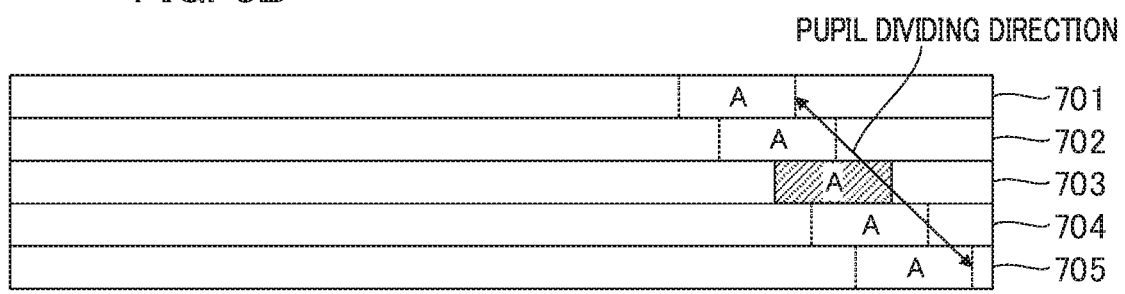

FIG. 8B illustrates the correlation calculation at the diagonal image height position of the imaging element 102. At the diagonal image height position in which vignetting is significantly generated, the peak positions of the A image and the B image change so that the pupil dividing direction becomes diagonal. Therefore, it is possible to calculate the shift position having the highest correlation by calculating the correlation amount at each shift position while shifting the relative positional relation between the A image and the A+B image in the diagonal direction. In FIG. 8B, the hatched portion shows the window range for calculating a correlation amount, and the range of the arrows on both sides of the hatched portion shows the shift range of the window. Accordingly, at the diagonal image height position where the pupil dividing direction becomes a diagonal direction, it is shown that the correlation amount is calculated by using the A+B image in the neighboring row of the A image in addition to the A image and the A+B image that is in the row that is the same as the A image while shifting the A image and the A+B image in the diagonal direction.

Note that, as a method for calculating a correlation amount, a technique such as SAD (Sum of Absolute Difference) can be used. As shown in FIG. 8A, in performing a correlation calculation by using the A image and the A+B image in the same line while shifting the A image and the A+B image in the horizontal direction, the difference between the A+B image (imaging signal) and the A image (first image signal) can be calculated as a B image (second image signal) and the correlation calculation between the A image and the B image may be performed. At the image height center position, since a long base line length can be secured for the correlation calculation between the A image and the A+B image, it is possible to perform focus detection with higher accuracy.

As shown in FIG. 8A, in the case where the correlation calculation is performed in the horizontal direction by using the A image and the A+B image in the same line, for example, a correlation calculation by using the formula (A) is performed (first calculation method). If the A image and the B image that serve as a pair of image signals are respectively denoted by A(k) and B(k) (1≤k≤P), the correlation amount COR (h) calculated by the correlation calculation is calculated by the following formula (1).

[Formula 1]

$$COR(h) = \sum_{j=1}^{W1} |A(j + h\max - h) - B(j + h\max + h)| \quad (1)$$

$$(-h\max \leq h \leq h\max)$$

In the formula (1), "W1" corresponds to the size of the window for calculating the correlation amount, and "hmax" corresponds to the number of times (shift number) that the position of the window between the pair of signals is changed. By calculating the value of "h", which has the minimal value of the correlation amount COR that has been obtained by the formula (1), the shift position (image shift amount) having the highest correlation between the A image and the B image can be calculated. By using the obtained image shift amount and base line length information, a defocus amount as a focus detection result is obtained.

In contrast, as shown in FIG. 8B, in the case where the correlation calculation is performed in the diagonal direction by using the A image and the A+B image in different lines, the A image is read out at 5 line intervals in the present embodiment, so that the A image is not read out at the top and bottom lines of the A image (lines 701 to 702, lines 704 to 705). Therefore, depending on the shift amount, the cases are classified as in the formulae below to obtain a correlation amount (second calculation method).

$$COR(h) = \sum_{j=1}^{W1} |A(j + h\max) - A + B1(j + h\max + h)| \quad (2)$$

$$(-h\max \leq h \leq h1)$$

$$COR(h) = \sum_{j=1}^{W1} |A(j + h\max) - A + B2(j + h\max + h)| \quad (3)$$

$$(h1 \leq h \leq h2)$$

$$COR(h) = \sum_{j=1}^{W1} |A(j + h\max) - A + B3(j + h\max + h)| \quad (4)$$

$$(h2 \leq h \leq h3)$$

$$COR(h) = \sum_{j=1}^{W1} |A(j + h\max) - A + B4(j + h\max + h)| \quad (5)$$

$$(h3 \leq h \leq h4)$$

$$COR(h) = \sum_{j=1}^{W1} |A(j + h\max) - A + B5(j + h\max + h)| \quad (6)$$

$$(h4 \leq h \leq h\max)$$

In the formulae (2) to (6), the A image signal that has been obtained from the line 703 is denoted by A(k) (1≤k≤P). In contrast, the A+B image signal calculates a correlation amount while switching the A+B image signal of 5 lines, for example, A+B1(k) obtained from the line 701 and A+B2(k) obtained from the line 702. In the A image, the signal is obtained only from the line 703, so unlike the case of the above formula (1), the correlation amount is calculated while shifting only the A+B image in a state in which the signal range of the A image is fixed irrespective of the number of shifts. A process that calculates a defocus amount by using the obtained correlation amount COR is similar to the case of formula (1).

The description will return to FIG. 6. In step S605, the control unit 107 determines whether or not the focus detection process for all the focus detection areas has been completed. If the focus detection for all the areas has been completed, the process proceeds to step S606. In contrast, if the focus detection for all the areas has not been completed, the process returns to step S602. In step S606, the control unit 107 drives the lens of the imaging optical system 101 in accordance with a lens driving amount determined based on the focus detection result and performs focus adjustment. Step S607 is the end of the shooting sequence.

As described above, in the case of performing focus detection by using the A image signal that has been discretely read out, it is possible to perform a focus detection process in which erroneous detection due to vignetting is reduced by performing a focus detection process with reference to a plurality of imaging signals around the A image signal.

Figure 9:
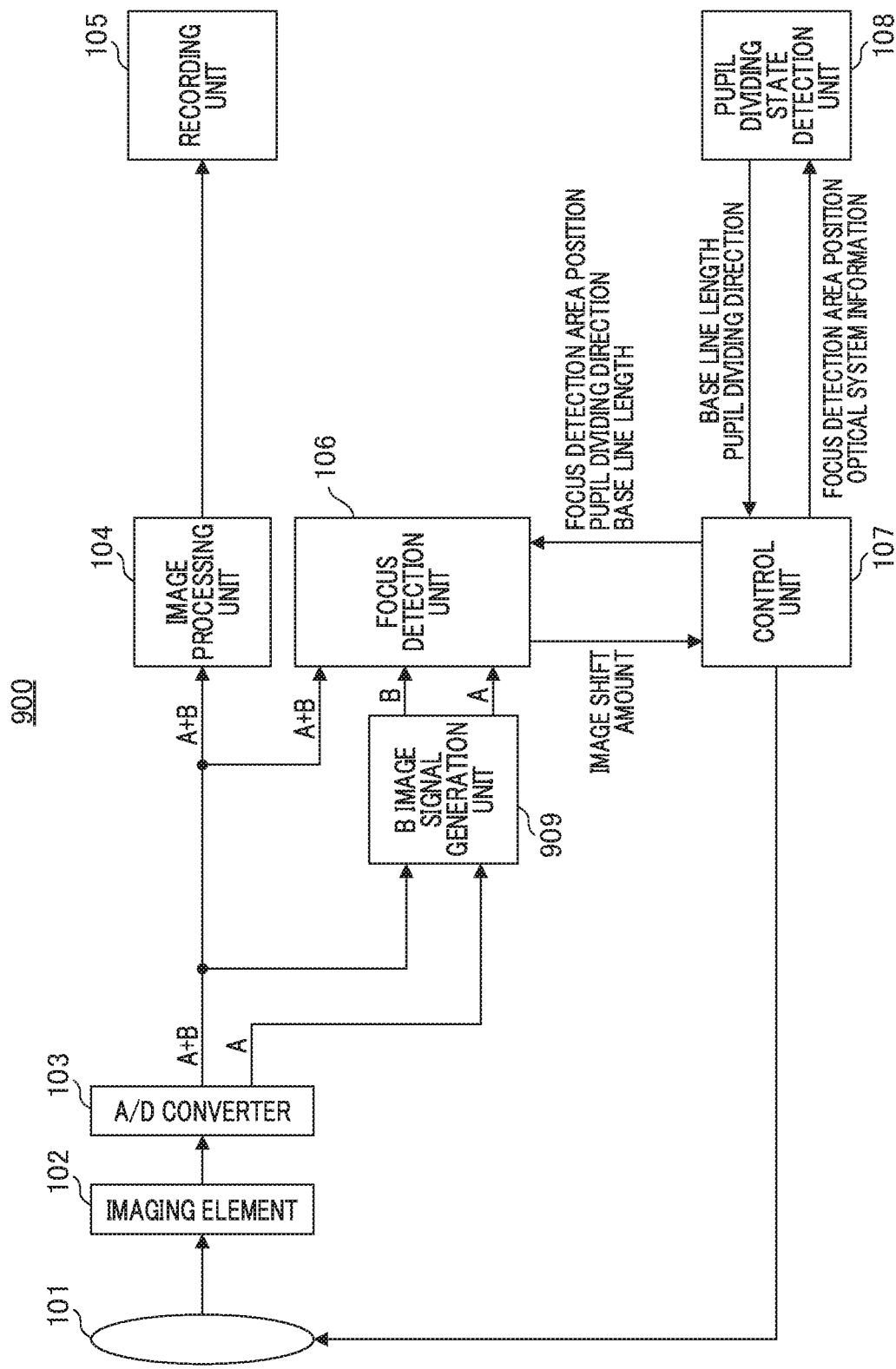
FIG. 9 is a block diagram illustrating a configuration of the imaging apparatus.

Note that in the present embodiment, an example in which the phase difference between the imaging signal and the A image signal is detected irrespective of the position of the focus detection region has been described. However, in the region in which the influence of vignetting is lower, the correlation calculation by using a pair of image signals for which the pupil is divided may be performed in a manner similar to the conventional technique. In that case, as shown in FIG. 9, a pair of image signals to be input to the focus detection unit 106 by the control unit 107 may be selected by using an imaging apparatus 900 provided with the B image signal generation unit 909 that generates the B image signal, in addition to the configuration of the imaging apparatus 100. The B image signal generation unit 909 is a circuit that generates the B image signal by subtracting the A image signal from the A+B image. If the pupil dividing direction such as the coordinate center of the imaging element 102 is the horizontal direction, the phase difference detection in the horizontal direction by the A image and the B image is performed, and at the diagonal image height of the imaging element 102, the calculation method may be selectively switched so as to detect the phase difference in any direction by the imaging signal and the A image.

Additionally, it may be possible to configure two focus detection units 106, simultaneously calculate the focus detection results in the horizontal direction of the A image and the B image and the focus detection result of the imaging signal and the A image, and selecting one of them. Additionally, it may be possible to configure two focus detection units 106, simultaneously calculate the focus detection result in the horizontal direction of the A image and the B image and the focus detection result of the imaging signal and the A image, combine the two focus detection results, and treat the combined result as the final focus detection result.

Embodiment 2

In the first embodiment, a method for reducing a focus detection error caused by vignetting has been described. In the present embodiment, a method for reducing a decrease in focus detection accuracy during shooting with low-illuminance will be described. In shooting under a low-illuminance environment, since an amount of light incident to the imaging element decreases, there are cases in which the signal level is adjusted by amplifying the signal by increasing the sensitivity of the imaging element. In amplifying the signal, the noise component riding on the imaging signal is also amplified in the same way, so the SN ratio deteriorates, and consequently the focus detection accuracy may decrease during low shooting with low-illuminance.

Figure 10:
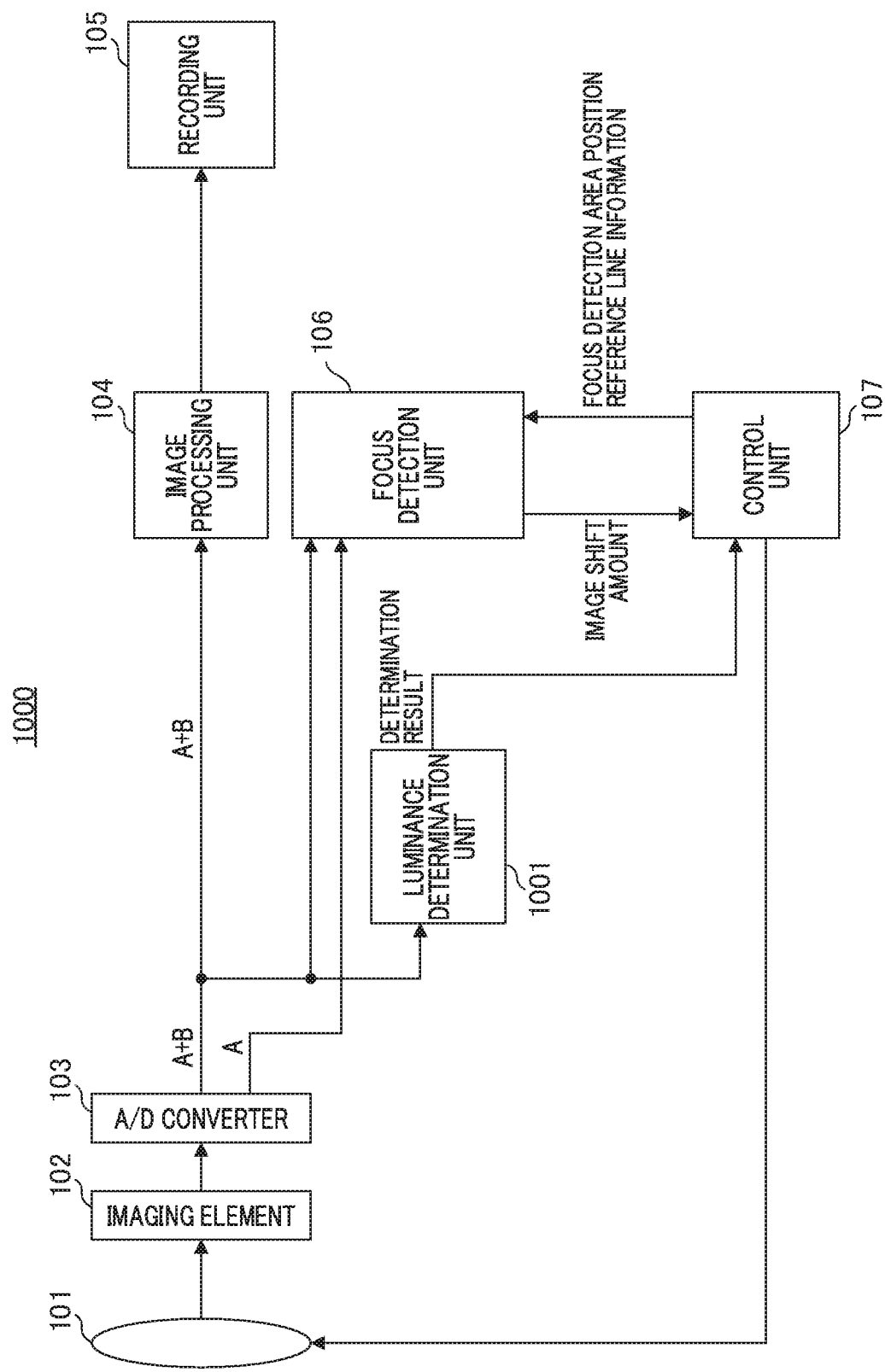
FIG. 10 is a block diagram illustrating a configuration of the imaging apparatus.

FIG. 10 is a block diagram of an imaging apparatus 1000 according to the present embodiment. Note that the same reference numerals are given to the same members as those in the first embodiment, and redundant explanation will be omitted. The imaging apparatus 1000 includes the imaging optical system 101, the imaging element 102, the A/D converter 103, the image processing unit 104, the recording unit 105, the focus detection unit 106, the control unit 107, and the luminance determination unit 1001. Note that the imaging apparatus 1000 is not limited to an imaging apparatus in which the lens device and the main body are integrated, and an interchangeable lens imaging apparatus in which a lens device including the imaging optical system 101 can be attached to and detached from the main body may also be used.

The luminance determination unit 1001 determines whether or not the luminance is higher than a predetermined threshold based on the obtained captured image (A+B image). Subsequently, the luminance determination unit 1001 outputs the determination result of the luminance to the control unit 107. The control unit 107 controls the entire system of the imaging apparatus 1000. Additionally, the control unit 107 controls the calculation of the focus detection unit 106 based on the focus detection area and the determination result by the luminance determination unit 1001.

Figure 11:
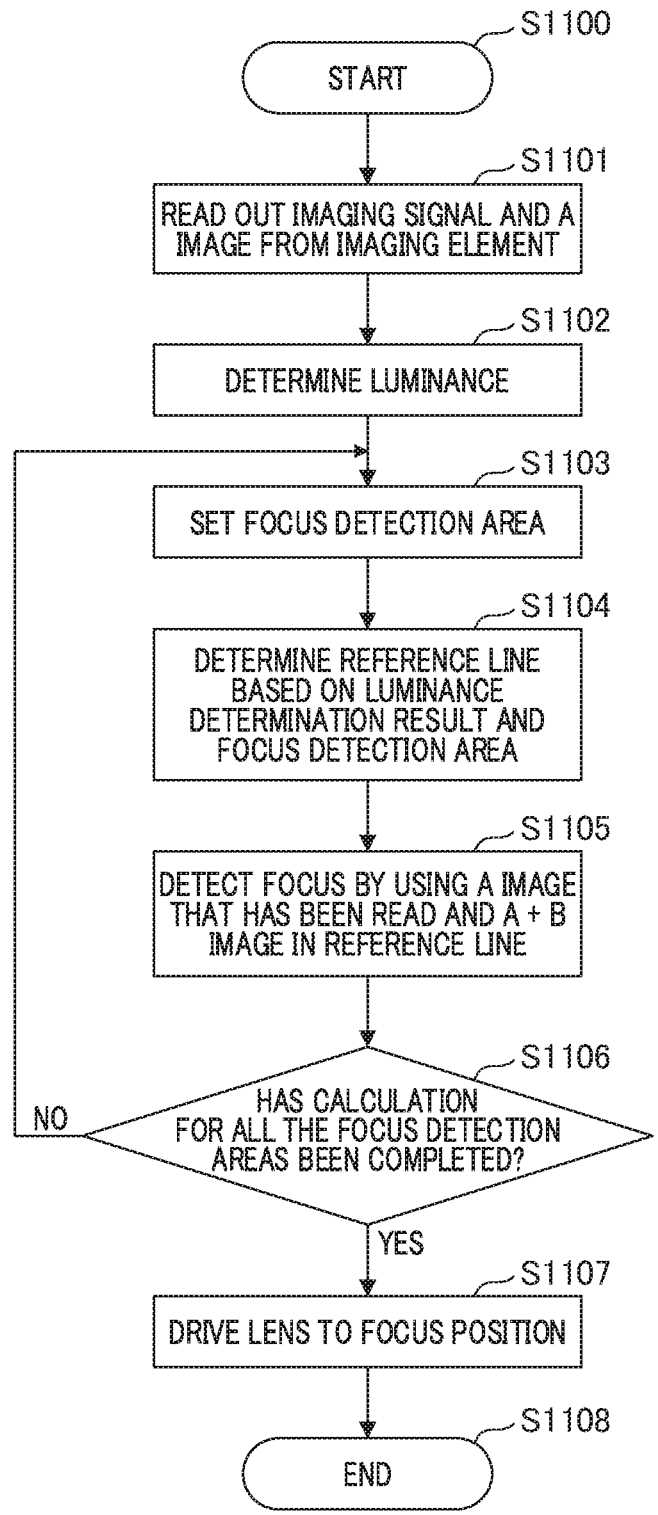
FIG. 11 is a flowchart of a focus detection process by the imaging apparatus.

Next, with reference to FIG. 11, a flow of focus detection by the imaging apparatus 1000 according to the present embodiment will be described. FIG. 11 is a flowchart showing the flow of focus detection by the imaging apparatus 1000. First, in step S1100, the imaging apparatus 1000 starts a shooting sequence and starts focus detection. The shooting sequence starts, for example, if the shutter is pressed by the user. In step S1101, the imaging signal (A+B image) and A image signal for one plane are read out from the imaging element 102. Note that the readout control that is the same as that in the first embodiment is performed, the imaging signals are read out in all rows, and the A image signal is read out at 5 line intervals.

In step S1102, the luminance determination unit 1001 performs a luminance determination process. In the luminance determination, for example, it is determined whether or not imaging is performed with low luminance by comparing the sum of the pixel values of the entire screen with a predetermined threshold. If the sum of the pixel values of the entire screen is higher than the predetermined threshold, it is determined that imaging is performed under normal conditions. In contrast, if the sum of the pixel values of the entire screen is equal to or less than the predetermined threshold, it is determined that the shooting is performed under the low luminance condition. Note that the method of luminance determination is not limited thereto, and other known techniques may be used.

In step S1103, the control unit 107 sets an arbitrary focus detection area. In step S1104, the control unit 107 determines a reference line in the set focus detection area in accordance with the luminance determination result. The reference line is the A+B image that is paired with the A image in the focus detection area that is used for the correlation calculation for focus detection. In the case of shooting under normal conditions where the luminance is higher than the predetermined threshold, the A+B image that is the same line as the read-out A image is set as the reference line. In contrast, in the case of shooting under a low luminance condition in which the luminance is equal to or less than the predetermined threshold, in addition to the A+B image that is in the same line as the read-out A image, the A+B image in the neighboring line is set as the reference line.

In step S1105, the focus detection unit 106 performs a correlation calculation. The focus detection unit 106 performs the correlation calculation based on the position information of the focus detection area and the reference line information obtained from the control unit 107. Details of the correlation calculation in the present embodiment will be described with reference to FIG. 12.

Figure 12:
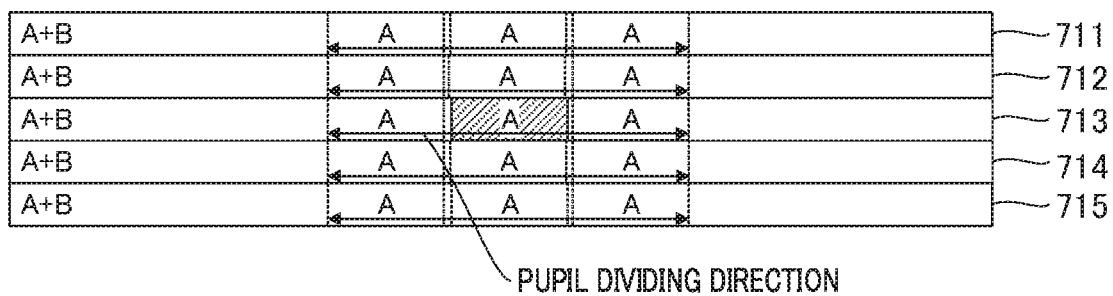
FIG. 12 illustrates a correspondence relation of the correlation calculation in focus detection by the imaging apparatus.

FIG. 12 illustrates a correlation calculation if it has been determined that the luminance is low. Here, an example will be described in which the two lines above and below the line from which the A image is read out are set as reference lines of the A+B image. In this case, a correlation calculation for a total of five lines is performed by combining the A image in the line 713 and the A+B image in each of the line 711 to the line 715. Specifically, the correlation calculation is performed between the A image in the line 713 and the A+B image in the line 711, the A image in the line 713 and the A+B image in the line 712, the A image in the line 713 and the A+B image in the line 713, the A image in the line 713 and the A+B image in the line 714, and the A image in the line 713 and the A+B image in the line 715. Then, each image shift amount calculated by the correlation calculation is added to determine the final image deviation amount. As described above, the calculation in different lines is performed, so that erroneous detection due to sensor noise during low luminance can be suppressed.

The description will return to FIG. 11. In step S1106, the control unit 107 determines whether or not the focus detection process has been completed for all the focus detection areas. If the focus detection has been completed for all the areas, the process proceeds to step S1107. In contrast, if the focus detection for all the areas has not been completed, the process returns to step S1103. In step S1107, the control unit 107 drives the lens of the imaging optical system 101 to perform focus adjustment in accordance with an amount of lens driving determined based on the focus detection result.

Note that in the present embodiment, although an example is shown in which the final image shift amount is determined by adding the image shift amounts for a plurality of lines, the final image shift amount may be selected from the results for five lines. Additionally, the phase difference with respect to the A image may be calculated by using a signal obtained by adding the signal output of the A+B image output from a wider region (many rows) compared to the A image to the direction perpendicular to the direction for calculating the phase difference. By adding a plurality of rows of the A+B image, it is possible to improve the signal-to-noise ratio and to perform more accurate focus detection. As described with reference to FIG. 9, in calculating the B image for focus detection, the A+B image signals in a plurality of rows corresponding to the A image are added and the difference between the A+B image and the A image after addition may serve as the B image.

Additionally, in adding the A+B images in a plurality of rows in order to align the peaks of the A+B image and the A image after addition, the peak of the A+B image in a direction perpendicular to the direction for calculating the phase difference in the region to be added is preferably aligned with the A image on which the correlation calculation is performed. This is because, in the case of an object having an edge contrast in a direction that is diagonal to a direction for calculating the phase difference, the image shift amount of the A image and the A+B image is caused not due to defocusing, but due to the difference in the position of the boundary of edges for each line. In order to reduce a detection error in the image shift amount due to the difference in the position of the boundary of the edges, a focus detection error can be reduced by aligning the peaks of the A+B image and the A image after addition.

Additionally, in step S1105, in order to determine the reliability of the correlation calculation by using the A image and the A+B image in the line 713, the correlation calculation result with the A+B image in the neighboring line may be referenced. Originally, since another line, which is not the line 713, receives a light of an optical image of a spatially different region, there is no guarantee that an optical image having the same shape is sampled and obtained as a signal output. For example, in an object such as a white vertical line on a black background, the same signals are output from any line, but in an object such as a person's face, the signals that are output from each line are different. In performing the correlation calculation between the A image in the line 713 and the A+B image in another line, if a shape difference between a pair of signal waveforms is large, the reliability of the obtained image shift amount is low. By using this fact, the correlation calculation is performed on the A+B image in the line 713 in contrast with the A+B image in another line, the reliability determination may be performed based on the magnitude of the minimal value of the correlation amount indicating the coincidence of a waveform and the variation of a plurality of pairs of image shift amounts and the like. Even if the correlation calculation is performed by using the A image and the B image, the reliability determination can be similarly performed.

Additionally, in performing the reliability determination, it may be possible to select using either the correlation calculation result using the A image and the A+B image in the same line, or using the correlation calculation using the A+B image in the neighboring line in addition to the A image and the A+B image that is in the same line as the A image, based on the reliability determination result. Thereby, if the reliability of the focus detection result of the correlation calculation using the A image and the A+B image in the neighboring line and in the same line as the A image is low, the correlation calculation result using the A image and the A+B image in the same line having higher reliability can be used as the focus detection result. Additionally, in order to determine the reliability of the correlation calculation, it may be possible to use contrast information of a pair of signals (for example, peak bottom difference, sum of absolute values of adjacent differences, and sum of squares of adjacent differences) without performing an additional correlation calculation.

As described above, in performing focus detection by using the A image signal that has been discretely read out, it is possible to perform a focus detection process in which false detection due to sensor noise is reduced by performing a focus detection process with reference to a plurality of imaging signals around the A image signal.

Embodiment 3

If the frame rate is high in movie shooting and the like, the time that is allowed as a readout time per row becomes shorter. In reading out the two signals of the A image and the A+B image for one row, the readout time is required to be double compared to reading out only the imaging signal. Accordingly, it is necessary to read out the signal in a shorter time. In the first and second embodiments, the rows for reading out the A image are limited, and the number of readout rows necessary for one frame is reduced, thereby reducing the readout time. Except for this, a method for reducing the readout time is also conceivable by limiting the column from which the A image is read out, in other words, by limiting it to a narrow region in the direction (horizontal direction) for calculating the phase difference. However, if the columns for reading out the A image are limited, the signals to be used for calculating the phase difference decreases in the horizontal direction, so that the region where focus detection is possible narrows in the horizontal direction. In the present embodiment, a method will be described for realizing the maintaining of a wide focus detection region even if a column for reading out the A image is limited in order to reduce a readout time of a signal to be used for focus detection. Note that since the imaging apparatus according to the present embodiment is the same as the imaging apparatus 1000 described in the second embodiment, its description will be omitted.

Figure 13:
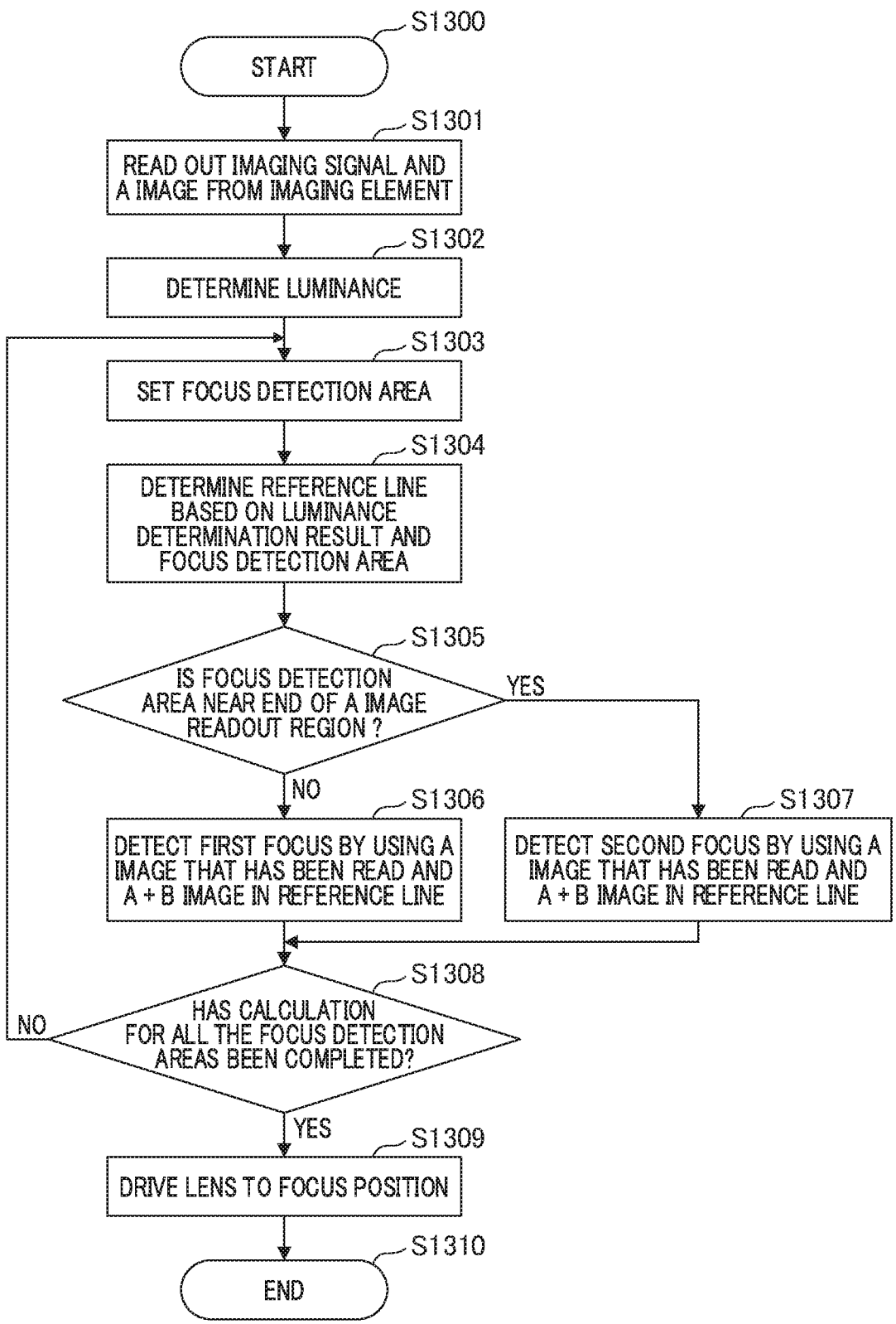
FIG. 13 is a flowchart of the focus detection process.

With reference to FIG. 13, a flow of focus detection by the imaging apparatus 1000 according to the present embodiment will be described. FIG. 13 is a flowchart showing a flow of focus detection by the imaging apparatus 1000. First, in step S1300, the imaging apparatus 1000 starts a shooting sequence and starts focus detection. The shooting sequence starts, for example, if the shutter is pressed by a user. In step S1301, the imaging signal (A+B image) and the A image signal are read out for one plane from the imaging element 102. Details of the read control will be described with reference to FIG. 14.

Figure 14:
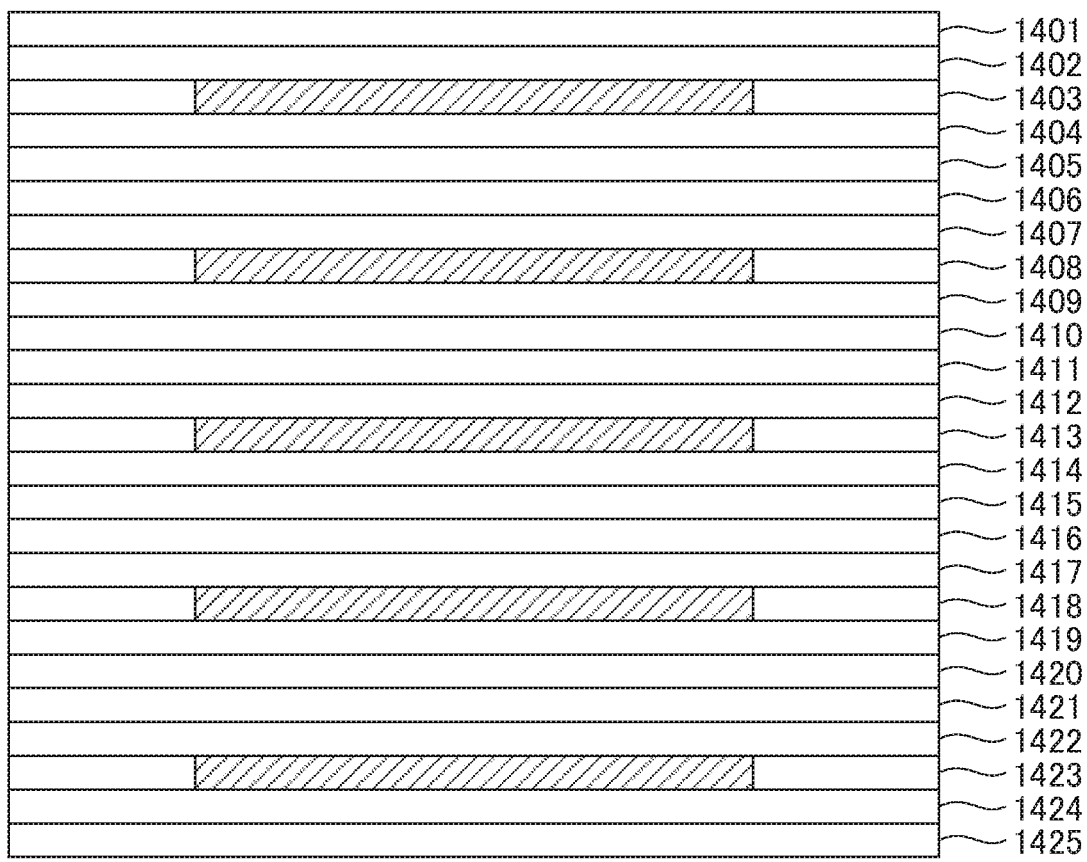
FIG. 14 illustrates a relation between the imaging element and an A image readout range.

FIG. 14 illustrates readout control of each line of the imaging element 102. Each rectangle shown by lines 1401 to 1425 visually indicates a readout mode in each line of the imaging element 102. A white-colored line such as the line 1401 is a line read out in the first readout mode in which only the imaging signal (A+B image) is read out. A line hatched only in the central portion such as the line 1403 is a line read out in the second readout mode in which the A image signal in the region limited to the horizontal direction shown by the hatched portion is read out in addition to the imaging signal (A+B image). That is, in the present embodiment, a case is shown in which the imaging signals (A+B image) are read out in all the rows and the A image signal is read out in the region limited to the horizontal direction at 5 line intervals.

The description returns to FIG. 13. In step S1302, the luminance determination unit 1001 performs a luminance determination process. The luminance determination process is similar to the luminance determination process in step S1102 in the second embodiment. In step S1303, the control unit 107 sets an any focus detection area.

In step S1304, the control unit 107 determines a reference line in the focus detection area that has been set in accordance with the luminance determination result. The reference line is the A+B image that is paired with the A image in the focus detection area, which is used for the correlation calculation for focus detection. In the case of shooting under a normal condition where the luminance is higher than a predetermined threshold, the A+B image in the line that is the same as the A image that has been read out is set as a reference line. In contrast, in the case of shooting under a low luminance condition where the luminance is equal to or less than a predetermined threshold, the A+B image in the neighboring line is set as a reference line in addition to the A+B image in the line same as the A image that has been read out.

In step S1305, the control unit 107 determines whether or not the focus detection area that has been set is close to the boundary of the A image readout region (hatched area in FIG. 14). Whether or not the focus detection area that has been set is close to the boundary of the A image readout region is determined based on whether or not the distance between the focus detection area that has been set and the boundary of the A image readout region is equal to or less than a predetermined threshold. If the distance between the focus detection area that has been set and the boundary of the A image readout region is greater than a predetermined threshold, the process proceeds to step S1306. In contrast, if the distance between the focus detection area that has been set and the boundary of the A image readout region is equal to or less than a predetermined threshold, the process proceeds to step S1307.

In step S1306, the focus detection unit 106 performs a correlation calculation by using the method shown by the formula (1) of the embodiment. In step S1307, the focus detection unit 106 performs a correlation calculation by using the method shown by the following formula (7). Where the A image and the B image are denoted as a pair of image signals by A(k), B(k) (1≤k≤P), the correlation amount COR (h) calculated by the correlation calculation is calculated by the following formula (7) (third calculation method).

$$COR(h) = \sum_{j=1}^{W1} |A(j + h\max) - A + B(j + h\max + h)| \quad (7)$$

$$(-h\max \le h \le h\max)$$

In the formula (7), "W1" corresponds to the size of the window for calculating the correlation amount, and "hmax" corresponds to the number of times (shift number) to change the position of the window between the pairs of signals. It is possible to calculate a shift position (image shift amount, phase difference) having the highest correlation between the A image and the B image by calculating the value of "h" that has the minimum value of the correlation amount COR obtained by the formula (7). A defocus amount as a focus detection result is obtained by using the obtained image shift amount and base line length information.

Figure 15A:
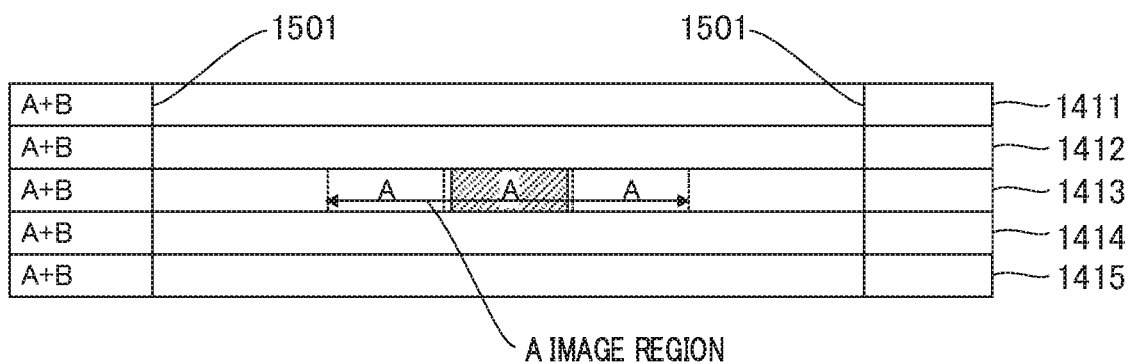
FIGS. 15A and 15B illustrate a difference in the correlation calculation depending on a position of a focus detection area.
Figure 15B:
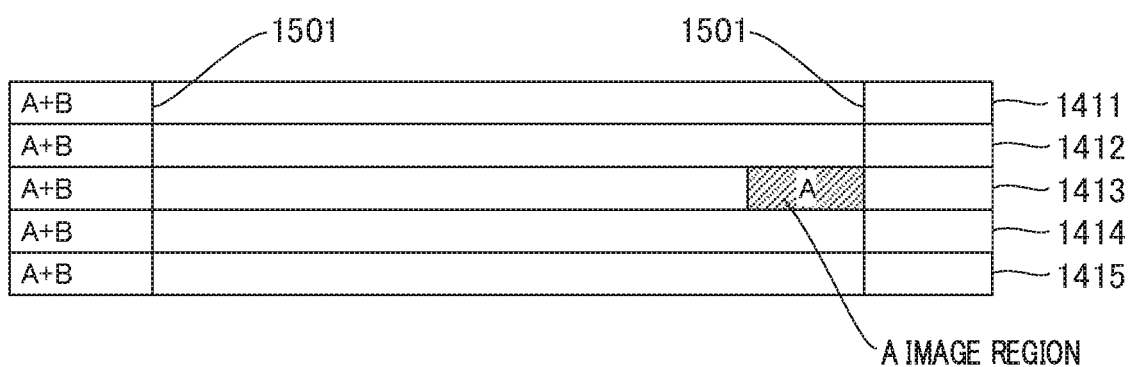

FIGS. 15A and 15B illustrate a difference in the correlation calculation depending on the position of the focus detection area. FIG. 15A illustrates a case where the focus detection area that has been set is separated from the boundary 1501 of the A image readout region. As shown in FIG. 15A, if the focus detection area is at a distance separated from the boundary 1501, which is the end portion of the A image readout region, by a distance more than a predetermined threshold, the A image signal can be used in both the window region and the shift region during the correlation calculation. Therefore, in step S1306, the correlation calculation method by the formula (1) can be used.

In contrast, FIG. 15B illustrates a case in which the focus detection area that has been set is close to the boundary 1501, which is the end portion of the A image readout region. In the case in FIG. 15B, the window region during the correlation calculation can secure the A image signal. However, the A image signal has not been read out because the shift region is outside the boundary 1501, and as a result, the A image signal cannot be used for the correlation calculation. Therefore, in step S1307, the correlation calculation is performed by the method that shifts the A+B image in a state in which the A image range during the correlation calculation is fixed by using the formula (7).

Additionally, if the focus detection area that has been set is separated from the boundary 1501 of the A image readout range, the correlation calculation may also be performed by using the A image and the A+B image, and additionally, the correlation calculation may also be performed by using the A image and the B image. In contrast, if the focus detection area that has been set is close to the boundary 1501 of the A image readout region, the correlation calculation can be performed with only the A image and the A+B image, and the correlation calculation cannot be performed with the A image and the B image. This is because the A image signal in the shift region cannot be obtained, so that the B image cannot be obtained from the difference from the A+B image.

The description will return to the FIG. 13. In step S1308, the control unit 107 determines whether or not the focus detection process for all the focus detection areas has been completed. If the focus detection for all the areas has been completed, the process proceeds to step S1309. In contrast, if the focus detection for all the areas has not been completed, the process returns to step S1303. In step S1309, the control unit 107 drives the lens of the imaging optical system 101 and performs focus adjustment in accordance with a lens driving amount determined based on the focus detection result.

Note that, in the present embodiment, if the focus detection area is close to the boundary 1501 of the A image readout region, the calculation is performed in a state in which only the A image signal in the window range of the correlation calculation signal is used. However, as shown in FIG. 15B, the shift region on the far side of the boundary 1501 of the A image readout region can be used for the correlation calculation. Therefore, for example, if the shift number "h" is negative, the correlation calculation may be performed by using the formula (1) and if the shift number "h" is positive, the correlation calculation may be performed by using the formula (7).

As described above, according to the present embodiment, in the case where the focus detection is performed by using the A image signal that has been read out discretely, it is possible to perform focus detection with high accuracy while realizing high-speed operation by limiting the readout region of the A image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-054086, filed Mar. 22, 2018, which is hereby incorporated by reference wherein in its entirety.

What is claimed is:

1. An imaging apparatus comprising:
an imaging element configured to have a plurality of photoelectric conversion units for each of a plurality of pixels arranged in a row direction and a column direction; and
at least one processor and memory holding a program which makes the processor function as:
an acquisition unit configured to acquire an imaging signal based on a light beam that has passed through the entire pupil region of an imaging optical system and a first image signal based on a light beam that has passed through a part of the pupil region of the imaging optical system from the pixels; and
a calculation unit configured to calculate a phase difference by using the imaging signal and the first image signal,
wherein the calculation unit calculates the phase difference based on the first image signal and the imaging signal acquired from the pixels in a neighboring row of the first image signal.

2. The imaging apparatus according to claim 1,
wherein the processor further functions as a detecting unit configured to detect a pupil dividing direction based on position information of a focus detection region in the imaging element and information about the imaging optical system, and
wherein the calculation unit determines the imaging signal to be used for calculating the phase difference in accordance with the pupil dividing direction.

3. The imaging apparatus according to claim 2,
Wherein, if the pupil dividing direction is a horizontal direction, the calculation unit calculates a phase difference by performing a first correlation calculation by using an imaging signal in a row that is the same as the first image signal, and if the pupil dividing direction is a diagonal direction, the calculation unit calculates a phase difference by performing a second correlation calculation by using an imaging signal in the row that is the same as the first image signal and a neighboring row of the first image signal.

4. The imaging apparatus according to claim 1,
wherein the processor further functions as a luminance detecting unit configured to detect a luminance of the captured image corresponding to the imaging signal,
wherein the calculation unit determines the imaging signal to be used for calculating the phase difference in accordance with the luminance.

5. The imaging apparatus according to claim 1,
wherein the processor further functions as a determining unit configured to determine the reliability of the correlation calculation performed by the calculation unit, and
wherein the calculation unit uses the result of a correlation calculation determined to be high in reliability by the determination unit as a phase difference.

6. The imaging apparatus according to claim 5,
wherein the determination unit determines the reliability based on a waveform of the first image signal and the imaging signal that have been used for the correlation calculation.

7. The imaging apparatus according to claim 1,
wherein, if a distance between a focus detection region and the end portion of a region from which the first image signal is read out is larger than a threshold, the calculation unit performs a first correlation calculation for which the first image signal and the imaging signal are shifted, and wherein, if a distance between the focus detection region and the end portion of the region from which the first image signal is read out is equal to or less than a threshold, the calculation unit performs a third correlation calculation for which only the imaging signal is shifted in a state in which the first image signal is fixed.

8. The imaging apparatus according to claim 1, wherein the acquisition unit acquires the imaging signal for each row and acquires the first image signal at predetermined line intervals.

9. The imaging apparatus according to claim 1, wherein the calculation unit calculates a second image signal corresponding to a signal based on a light beam that has passed through another part of the pupil region, which is different from a part of the pupil region of the imaging optical system, by subtracting the first image signal from the imaging signal and calculates a phase difference by using the first image signal and the second image signal corresponding to the imaging signal.

10. A control method of an imaging apparatus including an imaging element having a plurality of photoelectric conversion units for a plurality of pixels arranged in a row direction and a column direction, comprising the steps of:

acquiring an imaging signal based on a light beam that has passed through the entire pupil region of an imaging optical system and a first image signal based on a light beam that has passed through a part of the pupil region of the imaging optical system from the pixels; and calculating a phase difference by using the imaging signal and the first image signal, wherein, in calculating, a phase difference is calculated based on the first image signal and the imaging signal acquired from the pixels in a neighboring row of the first image signal.

* * * * *